United States Patent [19]
Dambmann et al.

[11] Patent Number: 5,863,573
[45] Date of Patent: Jan. 26, 1999

US005863573A

[54] PROCESS FOR PRODUCING CHEESE

[75] Inventors: Claus Dambmann, Soeborg; Peter Budtz, Frederiksberg; Steen Bennike Mortensen, Bagsvaerd, all of Denmark

[73] Assignee: Novo Nordisk A/S, Bagsvaerd, Denmark

[21] Appl. No.: 292,550

[22] Filed: Aug. 18, 1994

Related U.S. Application Data

[63] Continuation of Ser. No. 927,624, filed as PCT/DK91/00068, Mar. 8, 1991, abandoned.

[30]       Foreign Application Priority Data

Mar. 9, 1990 [DK] Denmark ................................. 0634/90

[51] Int. Cl.⁶ ..................................................... A23C 9/12
[52] U.S. Cl. ................................ 426/36; 426/34; 426/38; 426/42; 426/43; 426/582
[58] Field of Search ................................. 426/34, 36, 37, 426/38, 39, 40, 41, 42, 43, 580, 582

[56]           References Cited

U.S. PATENT DOCUMENTS

| | | | |
|---|---|---|---|
| 1,745,962 | 2/1930 | Thompson | 426/36 |
| 3,886,288 | 5/1975 | Rice et al. | 426/36 |
| 3,975,544 | 8/1976 | Kosikowski et al. | 426/42 |
| 4,158,607 | 6/1979 | Kalinowski et al. | 426/36 |
| 4,266,031 | 5/1981 | Tang et al. | 435/188 |
| 4,379,170 | 4/1983 | Hettinga et al. | 426/40 |
| 4,482,574 | 11/1984 | Lee | 426/7 |
| 4,690,826 | 9/1987 | Haard et al. | 426/40 |

FOREIGN PATENT DOCUMENTS

| | | |
|---|---|---|
| 0 144 274 | 6/1985 | European Pat. Off. . |
| 0 269 593 | 6/1988 | European Pat. Off. . |
| 0 355 399 | 2/1990 | European Pat. Off. . |
| 0 482 879 | 4/1992 | European Pat. Off. . |
| 247 832 | 7/1987 | Germany . |

OTHER PUBLICATIONS

Chobert et al., J. Agric. Food Chem., vol. 36, pp. 220–224 (1988).

Olesen, Chem. Abs,. vol. 98, No. 1, p. 335, abstract No. 3693n (1983).

*Primary Examiner*—Leslie Wong
*Attorney, Agent, or Firm*—Steve T. Zelson, Esq.; Valeta A. Gregg, Esq.

[57]           ABSTRACT

A process for producing cheese, in which an enzyme preparation comprising a specific protease is added to cheese milk in the course of the process.

13 Claims, 4 Drawing Sheets

FIG. 4

```
         5         10        15        20        25        30
  1  SVIGSDDRTR VTNTTAYPYR AIVHISSSIG
 31  SCTSWHIGPK TVATAGHCIY DTSSGSFAGT
 61  ATVNPGRNGT SYPYGSVKST RYFIPSGWRS
 91  GNTGYDYGAI ELSEPIGNTV GYFGYGYTTS
121  SLVYTTVTIS GYPGDKTAGT QWQHSSPIAI
151  CETPKLQYAH DTYGGQSGSP VFEQSSSRTN
181  FDNLSCTKWS NHVKGXDGNV TAE
```

PROCESS FOR PRODUCING CHEESE

This application is a continuation application of application Ser. No. 07/927,624, filed Aug. 31, 1992, now abandoned, the contents of which are incorporated herein by reference which is a National stage filing of PCT/DK91/00,068 filed Mar. 8, 1991.

FIELD OF INVENTION

The present invention relates to a process for producing cheese, in which an enzyme preparation comprising a specific protease is added to cheese milk in the course of the process.

BACKGROUND OF THE INVENTION

In traditional cheesemaking, cheese is prepared by adding a starter culture and rennet to warm milk to form a curd (setting). When the desired consistency and strength of the curd has been obtained, the curd is cut, followed by separation of whey from the curd, e.g. by draining after which the curd is salted, pressed and stored (ripened).

In this process, a considerable loss of milk proteins and—to some extent—fat takes place due to the removal of whey so that the yield of cheese is decreased relative to the total content of proteins and fat in milk. A cheesemaking process has therefore been developed whereby the milk is concentrated, primarily by ultrafiltration, to approximately the fat and protein content desired in the finished product after which a starter culture, rennet and salt are added. No significant whey drainage occurs from the curd, and therefore the whey proteins (notably β-lactoglobulin and ó-lactalbumin) normally lost when the whey is removed are retained in the concentrate resulting (together with retained fat) in an increase in yield of about 10%.

However, the use of UF-concentrated milk for making cheese has only been commercially successful for a limited number of cheese types. A major cause of this is the effect of whey proteins on the characteristics of the resulting UF cheese. Thus, it has been found that undenatured whey proteins are resistant to hydrolysis by rennet, starter culture proteases and plasmin (De Boer and Nooy, *North European Dairy Journal* 46, 1980, pp. 52–61; De Koning et al., *Netherlands Milk and Dairy Journal* 35, 1981, pp. 35–46; Quist et al., *Beretning fra Statens Mejeriforsøg*, 1986, p. 268). The undenatured whey proteins may act as a filler resulting in cheese with a smoother texture. The change in texture is thought to be ascribable to the fact that the whey proteins do not participate in the formation of the casein matrix which is essential for the strength and firmness of many cheeses, in particular cheeses with a low moisture content, or may even negatively affect the matrix if present in an amount of up to 20% of the protein dry matter. It has further been observed that the whey proteins may negatively influence the process of cheese ripening in that they may have a dilution effect by lowering the proportion of casein in the curd (De Koning et al., supra) or that they may limit the accessibility of casein to the enzymes responsible for ripening.

The problem of decreases maturation rate of UF cheese cannot be overcome by denaturing the whey proteins, e.g. by heat treatment of the cheese milk, as it has been found that the presence of denatured whey proteins in certain UF cheeses adversely affect their stretch and melt properties on heating (Covacevich and Kosikowski, *Journal of Dairy Science* 61, 1978, pp. 704–709; Quist et al., supra; Olson, *Dairy Record* 85(7), 1984, p. 85). Furthermore, hydrolysis of denatured whey proteins may give rise to atypical flavours and textures of the ripened cheese (Green et al., *Journal of Dairy Research* 48, 1981, pp. 333–341; Brown and Ernstrom, *Journal of Dairy Science* 65, 1982, pp. 2391–2395; Banks and Muir, *Journal of the Society of Dairy Technology* 38, 1985, pp. 27–32). Denatured whey proteins may also affect the maturation rate in a similar fashion as undenaturated whey proteins, as discussed above.

SUMMARY OF THE INVENTION

It has surprisingly been found that the adverse effects arising from the retention of whey proteins in concentrated milk used for cheesemaking may be considerably reduced when an enzyme causing a limited specific hydrolysis of whey proteins without concomitantly causing any clotting of the milk is included in the cheesemaking process.

Accordingly, the present invention relates to a process of producing cheese, wherein:

(i) an enzyme preparation which comprises a proteolytic enzyme which is capable of effecting a limited specific hydrolysis of whey proteins, but which does not cause any clotting of milk, the enzyme preparation being substantially free from other proteolytic activity, is added to milk so as to effect said limited specific hydrolysis of the whey proteins in the milk;

(ii) a starter culture is added to the milk subsequently to or simultaneously with the enzyme preparation; and (iii) a milk-clotting enzyme is added to the milk subsequently to or simultaneously with the enzyme preparation added in step (i) and subsequently or simultaneously with the starter culture added in step (ii) so as to effect clotting of the milk, after which the resulting curd is processed in a manner known per se for producing cheese.

DETAILED DISCLOSURE OF THE INVENTION

In particular, the proteolytic enzyme is one which has the following characteristics:

(a) it is a serine protease specific for glutamic acid (Glu) and aspartic acid (Asp) residues;

(b) it has a specific activity of at least 25 cpu (as defined herein) per gram of enzyme protein;

(c) it has a molecular weight of about 23,600;

(d) it is inhibited by diisopropyl phosphofluoridate, but not by phenylmethane sulfonylfluoride;

(e) it exhibits 75% or more of its maximum activity in the pH range of 6.5–10.0.

This proteolytic enzyme has previously been characterized in U.S. Pat. No. 4,266,031 as a contaminant of subtilisin A produced by *Bacillus licheniformis*. However, there is no indication of the specific proteolytic activity of the enzyme in this U.S. patent, and its utility in the cheesemaking process of the invention is therefore not anticipated by the disclosure of the enzyme per se in the patent. According to the invention, it has surprisingly been found that the proteolytic enzyme is a protease which is specific for Glu and Asp residues. This property is important for the present purpose since it provides for limited and specific hydrolysis of whey proteins at Glu and/or Asp residues. These amino acid residues are hydrophilic, resulting in reduced bitterness of the resulting whey protein hydrolysate which therefore does not have any adverse effect on the flavour of the cheese produced by the process. It has furthermore surprisingly been found that although the proteolytic enzyme in question is capable of hydrolysing whey proteins, it does not cause any proteolysis of kappa-casein in its native state, presumably because the Glu residues present in casein are not accessible to the enzyme due to the three-dimensional structure of native kappa-casein. This means that, contrary to what might have been expected, the Glu/Asp specific protease used in the process of the invention does not, to the best of our current knowledge, adversely affect the cheesemaking process by changing the properties of the casein coagulum which might be important for the structure and/or texture of the resulting cheese.

Another proteolytic enzyme which is contemplated to be useful for the present purpose is the *Staphylococcus aureus* V8 protease which is also specific for Glu and Asp residues in proteins. Examples of other proteolytic enzymes contemplated to be of use for the present purpose are a Glu/Asp-specific protease from *Streptomyces thermovulgaris* (N. V. Khaidarova et al., *Biokhimiya* 54 (1), 1989, pp. 32–38), a Glu/Asp-specific protease from Actinomyces (O. V. Moslova et al., *Biokhimiva* 52 (3), 1987, pp. 358–366) and a Glu/Asp-specific protease from *Bacillus subtilis* (G. A. Rufo et al., *J. Bacteriol.* 172 (2), 1990, pp. 1019–1023).

By effecting partial hydrolysis of whey proteins by the present process, the subsequent steps in the cheesemaking process, i.e. addition of a starter culture and milk-clotting enzyme, and further salting, pressing and ripening the curd, may be conducted in the traditional way of producing cheese, e.g. as described in R. Scott, *Cheesemaking in Practice,* 2nd Ed., Elsevier, London, 1986. It is anticipated that the hydrolysis of the whey proteins by the proteolytic enzyme employed in the present process will make the partially hydrolysed whey proteins accessible to further decomposition by starter culture proteases resulting in an accelerated and more homogeneous cheese ripening (at least compared to that reported for UF cheese) as well as improved melting characteristics. In particular, the graininess of melted UF cheese may be avoided.

Any type of milk, in particular milk from ruminants such as cows, sheep or goats, may be used as the starting material in the process of the invention, e.g. reconstituted milk, whole milk, concentrated whole milk or skim milk. It is, however, believed that the present process is particularly well suited for overcoming the drawbacks previously reported to be connected with the use of concentrated milk.

The milk may be concentrated in various ways such as by evaporation or spray-drying, but is preferably concentrated by membrane filtration, i.e. ultrafiltration in which molecules with a molecular weight of up to 20,000 are allowed to pass the membrane, optionally with diafiltration before or after ultrafiltration, or possibly hyperfiltration in which molecules of a molecular weight of up to 500 are allowed to pass the membrane. Filtration implies that a larger amount of dry matter is retained in the curd, and consequently a higher yield of cheese is obtained. Ultrafiltration may be performed by cycling milk across a membrane such as a membrane of a suitable organic polymer or an inorganic ceramic material at an elevated pressure whereby the milk may be concentrated up to about 8 times. In this process, water and low molecular weight components are passed through the membrane, while proteins (including casein, lactoglobulin and lactalbumin) and fats are retained. For a more detailed description of the ultrafiltration process, see for instance Quist et al., supra.

When the milk used in the process of the invention is concentrated milk, it may, for practical reasons, be more convenient to add the proteolytic enzyme after the milk has been concentrated.

The amount of the proteolytic enzyme added according to the present process will vary according to the degree of concentration of the milk (which determines the amount of whey proteins in the concentrate), but will usually be added in an amount of 0.005–0.25 cpu/l of milk, preferably 0.01–0.1 cpu/l of milk, such as 0.05 cpu/l of milk.

According to the invention, hydrolysis of the whey proteins may be carried out for 0.5–4 hours, typically about 2 hours, to ensure a satisfactory degree of hydrolysis (cleavage at a sufficient number of accessible Glu and Asp residues in the whey protein molecule). The pH is suitably in the range of 6.4–7.0, typically about 6.7. The temperature is suitably between 30° and 37° C., typically about 34° C.

The proteolytic enzyme employed in the present process may be one producible by a microorganism, in particular a bacterium. Such a bacterium may be a strain of *Bacillus licheniformis,* e.g. a strain known to produce subtilisin A as well as another protease corresponding to the proteolytic enzyme defined above. In this case, the proteolytic enzyme may be prepared by culturing the bacterial strain under conditions conducive to the production of alkaline protease which may then be isolated, after which the protease activities may be separated by methods known per se, e.g. by the process described in the above-mentioned U.S. Pat. No. 4,266,031.

The strain of *Bacillus licheniformis* may also be a mutant strain, such as a mutant in which the gene encoding subtilisin A has been inactivated, for instance by conventional mutagenesis procedures involving the use of a mutagen such as nitrosoguanidine, e.g. substantially by the procedure disclosed in the above-mentioned U.S. Pat. No. 4,266,031 (disclosing the inactivation of the gene encoding the proteolytic enzyme of current interest). Alternatively, the inactivation of the subtilisin A gene may also take place by recombinant DNA techniques, e.g. by inserting one or more nucleotides into the subtilisin A gene so as to disrupt the sequence. This may, for instance, be done by homologous recombination, e.g. as described in F. A. Ferrari et al., *J. Bacteriol.* 154 (3), 1983, pp. 1513–1515. The proteolytic enzyme may also be produced by isolating the DNA sequence from a cDNA or genomic library of microorganism producing the enzyme, e.g. a strain of *Bacillus licheniformis,* inserting the DNA sequence into a suitable expression vector, transforming a suitable host microorganism with the vector, growing the host under conditions which are conducive to the production of the enzyme and recovering the enzyme from the culture. These steps may be carried out by standard procedures, cf. T. Maniatis et al., *Molecular Cloning: A Laboratory Manual,* Cold Spring Harbor, 1982.

In a particular embodiment of the present process, the proteolytic enzyme is one which has the amino acid sequence shown in the appended FIG. 4, or a derivative thereof.

In the present context, the term "derivative" is understood to indicate a proteolytic enzyme which is derived from the native enzyme by addition of one or more amino acids to either or both the C- and N-terminal end of the native protein, substitution of one or more amino acids at one or a number of different sites in the native amino acid sequence, deletion of one or more amino acids at either or both ends of the native protein or at one or more sites in the amino acid sequence, or insertion of one or more amino acids at one or more sites in the native amino acid sequence, provided that the proteolytic activity of the enzyme is not thereby impaired.

The starter culture added in step (ii) of the process of the present invention, is a culture of lactic acid bacteria used, in conventional cheesemaking, to ferment the lactose present in the milk and to cause further decomposition of the clotted casein into smaller peptides and free amino acids as a result of their production of proteases and peptidases. The starter culture may be added in amounts which are conventional for the present purpose, i.e. typically amounts of about $1 \times 10^4$–$1 \times 10^5$ bacteria/g of cheese milk, and may be added in the form of freeze-dried, frozen or liquid cultures. When the milk employed in the process of the invention is concentrated milk, it is preferred to add the starter culture after concentrating the milk, although this is not an absolute requirement as the starter bacteria will be retained during filtration.

In the process of the present invention, the milk-clotting enzyme may be any enzyme which is capable of effecting casein coagulation under cheesemaking conditions. Thus, the enzyme may be of animal or microbial origin. An example of a suitable milk-clotting enzyme of animal origin is chymosin (also known as rennet) which may be obtained from the lining of the fourth stomach of the calf, or which may be produced by recombinant DNA techniques, e.g. as described in GB 2,100,737. Examples of suitable milk-clotting enzymes of microbial origin are fungal proteases such as *Mucor miehei* acid protease (commercially available from Novo Nordisk A/S under the trademark Rennilase; cf. also GB 1 108 287), *Mucor pusillus* (K. Arima et al., *Methods in Enzymology*, vol. 19, 1970, pp. 446–459) or *Endothia parasitica* (J. R. Whitaker, *Method in Enzymology*, vol. 19, 1970, pp. 436–445). The Mucor proteases may furthermore be chemically modified to improve their properties, e.g. as described in U.S. Pat. No. 4,255,454 or U.S. Pat. No. 4,357,357.

The amount of milk-clotting enzyme added in the present process will vary according to the type of enzyme used and the degree of concentration of the milk, but the enzyme will usually be added in an amount of 18–25 ml of a commercial enzyme preparation (single-strength=1:14,000 Soxhlet units) per 100 l of milk.

It is at present contemplated that most types of cheese may advantageously be prepared by the process of the invention. There is, however, some indication that hard or semi-hard cheeses (with a dry matter content of about 50–70%) similar to Edam, Mozzarella, Danbo, Havarti or Cheddar are particularly advantageous to produce by the present process. Problems connected with the production of cheese from UF milk have primarily been encountered in the production of hard or semi-hard cheese. For instance, it has been reported that UF Mozzarella has significantly impaired melting characteristics compared to traditionally produced Mozzarella (Covacevich, *2nd Biennial Marschall International Cheese Conference*, 1981, Madison Wis. Marschall Products, pp. 237–244). It has also been reported that UF Mozzarella is difficult to grind and that the ground product becomes soft and releases serum on storage (Hansen, *North European Dairy Journal* 53, 1987, pp. 21–23). Impaired melting characteristics have also been reported for UF Havarti (Quist et al., supra) and cheese base (Ernstrom et al, *Journal of Dairy Science* 63, 1980, pp. 228–234). The reason for the impaired characteristics of hard and semi-hard UF cheeses in particular is believed to be the greater dependence of these cheeses on casein-casein interactions for obtaining a firm texture. Whey proteins which may interfere with such interactions, e.g. by dilution effects (De Koning et al., supra), are therefore expected to exert a greater influence on the texture of these cheese types. It has surprisingly been found that when a proteolytic enzyme as defined above which is capable of hydrolysing whey proteins into smaller (poly)peptides is added to the cheese milk according to the invention, the drawbacks associated with the use of concentrated milk for cheesemaking may be overcome or at least substantially reduced, in particular with respect to hard or semi-hard UF cheese or UF cheese which stretches and melts on heating.

In another aspect, the present invention relates to an enzyme preparation in liquid, stabilized, spray-dried, vacuum-dried, freeze-dried or granulated form, the preparation comprising a proteolytic enzyme with the following characterisics:

(a) it is a serine protease specific for glutamic acid (Glu) and aspartic acid (Asp) residues;

(b) it has a specific activity of at least 25 cpu (as defined herein) per gram of enzyme protein;

(c) it has a molecular weight of about 23,600;

(d) it is inhibited by diisopropyl phosphofluoridate, but not by phenylmethane sulfonylfluoride;

(e) it exhibits 75% or more of its maximum activity in the pH range of 6.5–10.0;

the enzyme preparation being substantially free from other proteolytic activity, for use in a process of producing cheese.

The various ways in which the enzyme preparation may be formulated are well known in the enzyme art, cf. for instance K. Aunstrup et al., "Production of Microbial Enzymes", in *Microbial Technology* (H. J. Peppler and D. Perlman, Eds.), 2nd Ed., Vol I, Academic Press 1979, pp. 295–297.

BRIEF DESCRIPTION OF THE DRAWINGS

The present invention is further illustrated in the following examples with reference to the appended drawings wherein:

FIG. 4 shows the amino acid sequence of the SP446 protease, wherein the amino acids are indicated in the established one-letter code.

Figure 1:
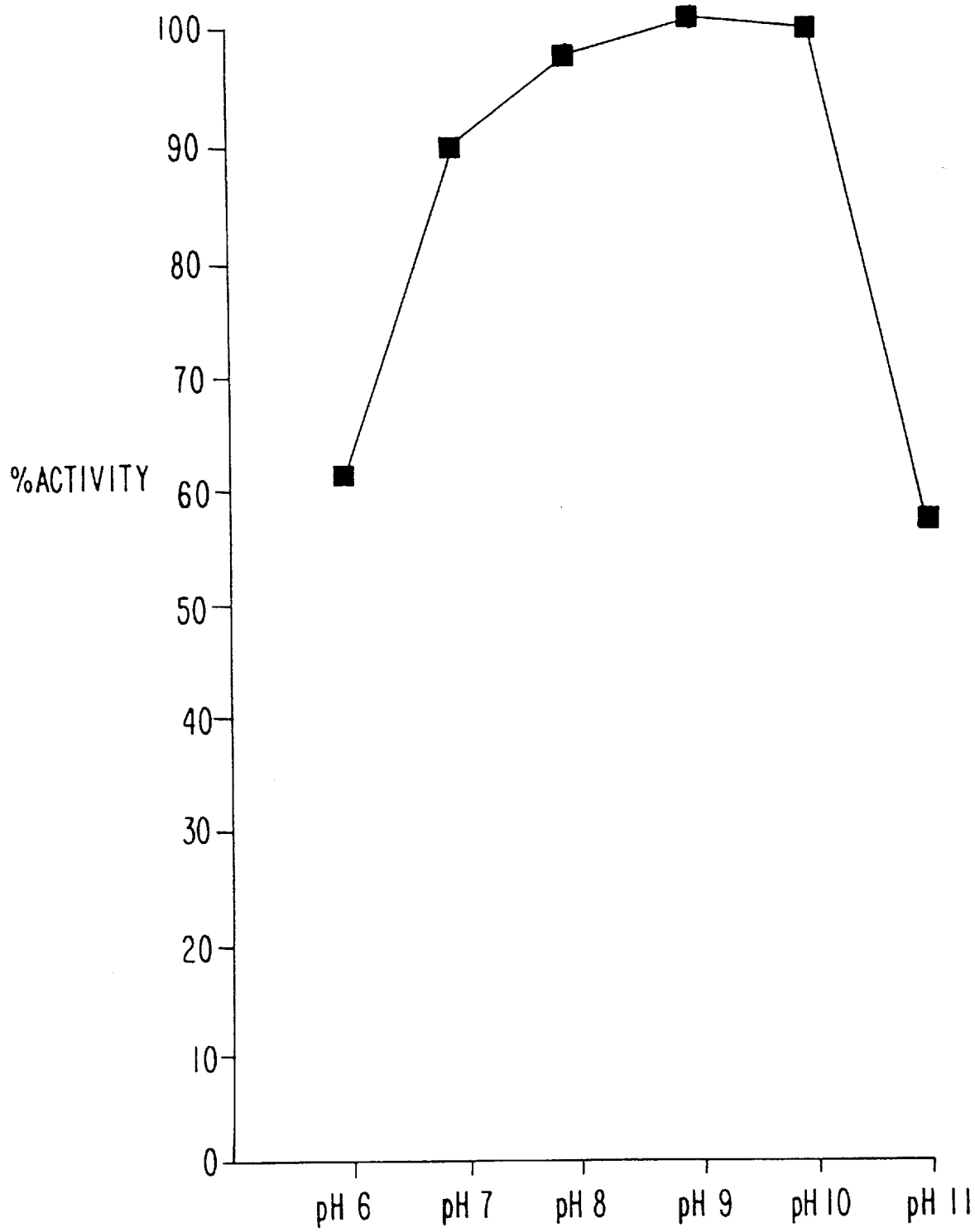
FIG. 1 is a graph showing the pH activity of the SP 446 protease.

The invention is further illustrated in the following examples which are not intended to be in any way limiting to the scope of the invention as claimed.

EXAMPLE 1

Characterization of *Bacillus licheniformis* BP 446 Protease

Yield of SP 446 protease

Alcalase™ PPA 1618 was purified as described in U.S. Pat. No. 5 4,266,031. The yield of purified SP 446 protease was determined by measuring the enzymatic activity of the starting and purified SP 446 protease using CBZ—Phe—Leu—Glu—pNA (Boehringer Mannheim) as substrate. It was necessary to add phenylmethane sulfonylfluoride (1:10 vol) in order to inactivate subtilisin A present in the enzyme preparation, as subtilisin A is able to degrade the substrate, apparently by cleaving after Phe or Leu. The enzymatic activity of the starting material (40 ml) was measured in a Perkin-Elmer, Lambda reader as the absorbance at 405 nm/min./ml and was determined to be 166,920. The enzymatic activity of the purified material (31 ml) was similarly measured and determined to be 158,720. Thus, the yield of SP 446 protease was 95%.

Proteolytic activity

The proteolytic activity of the SP 446 protease was determined to be 27 cpu/g using casein as substrate. 1 casein protease unit (cpu) is defined as the amount of enzyme liberating 1 millimole of primary amino groups (determined by comparison with a serine standard) per minute under standard conditions as described below:

A 2% (w/v) solution of casein (Hammarsten, supplied by Merck AG, Darmstadt, FRG) is prepared with the Universal Buffer described by Britton and Robinson, *J. Chem. Soc.*, 1931, p. 1451), adjusted to a pH of 9.5. 2 ml of the substrate solution are pre-incubated in a water bath for 10 min. at 25° C. 1 ml of an enzyme solution containing b g/ml of the enzyme preparation, corresponding to about 0.2–0.3 cpu/ml of the Universal Buffer (pH 9.5) is added. After 30 min. of incubation at 25° C., the reaction is terminated by the addition of a quenching agent (5 ml of a solution containing 17.9 g of trichloroacetic acid, 29.9 g of sodium acetate and 19.8 g of acetic acid made up to 500 ml with deionized water). A blank is prepared in the same way as the test solution with the exception that the quenching agent is added prior to the enzyme solution. The reaction mixtures are kept for 20 min. in a water bath after which they are filtered through Whatman 42 paper filters. A folder AF 228/1 describing this analytical method is available upon request from Novo Nordisk A/S, Denmark.

Primary amino groups are determined by their colour development with o-phthaldialdehyde (OPA), as follows:

7.62 g of disodium tetraborate decahydrate and 2.0 g of sodium dodecylsulfate are dissolved in 150 ml of water. 160 mg of OPA dissolved in 4 ml of methanol were then added together with 400 µl of β-mercaptoethanol after which the solution is made up to 200 ml with water. To 3 ml of the OPA reagent are added 400 µl of the filtrates obtained above, with mixing. The optical density (OD) at 340 nm is measured after about 5 min. The OPA test is also performed with a serine standard containing 10 mg of serine in 100 ml of Universal Buffer (pH 9.5). The buffer alone is used as a blank. The protease activity is calculated from the OD measurements by means of the following formula:

$$cpu/\text{ml enzyme solution}: \frac{(OD_t - OD_b) \times C_{ser} \times Q}{(OD_{ser} - OD_B) \times MW_{ser} \times t_i}$$

cpu/g of enzyme preparation=cpu/ml: b
wherein $OD_t$, $OD_b$, $OD_{ser}$ and $OD_B$ is the optical density of the test solution, blank, serine standard and buffer, respectively, $C_{ser}$ is the concentration of serine (mg/ml) in the standard (in this case 0.1 mg/ml), and $MW_{ser}$ is the molecular weight of serine (105.09). Q is the dilution factor for the enzyme solution (in this case 8) and $t_i$ is the incubation time in minutes (in this case 30 minutes).

pH activity

The pH dependence of the activity of the SP 446 protease was determined by the OPA casein method described above with the modification that the Universal Buffer was adjusted to different pH values, i.e. pH 6, 7, 8, 9, 10 and 11. The results are shown in FIG. 1 from which it appears that the SP 446 protease has a pH optimum in the range of pH 8–10.

Temperature activity

Figure 2:
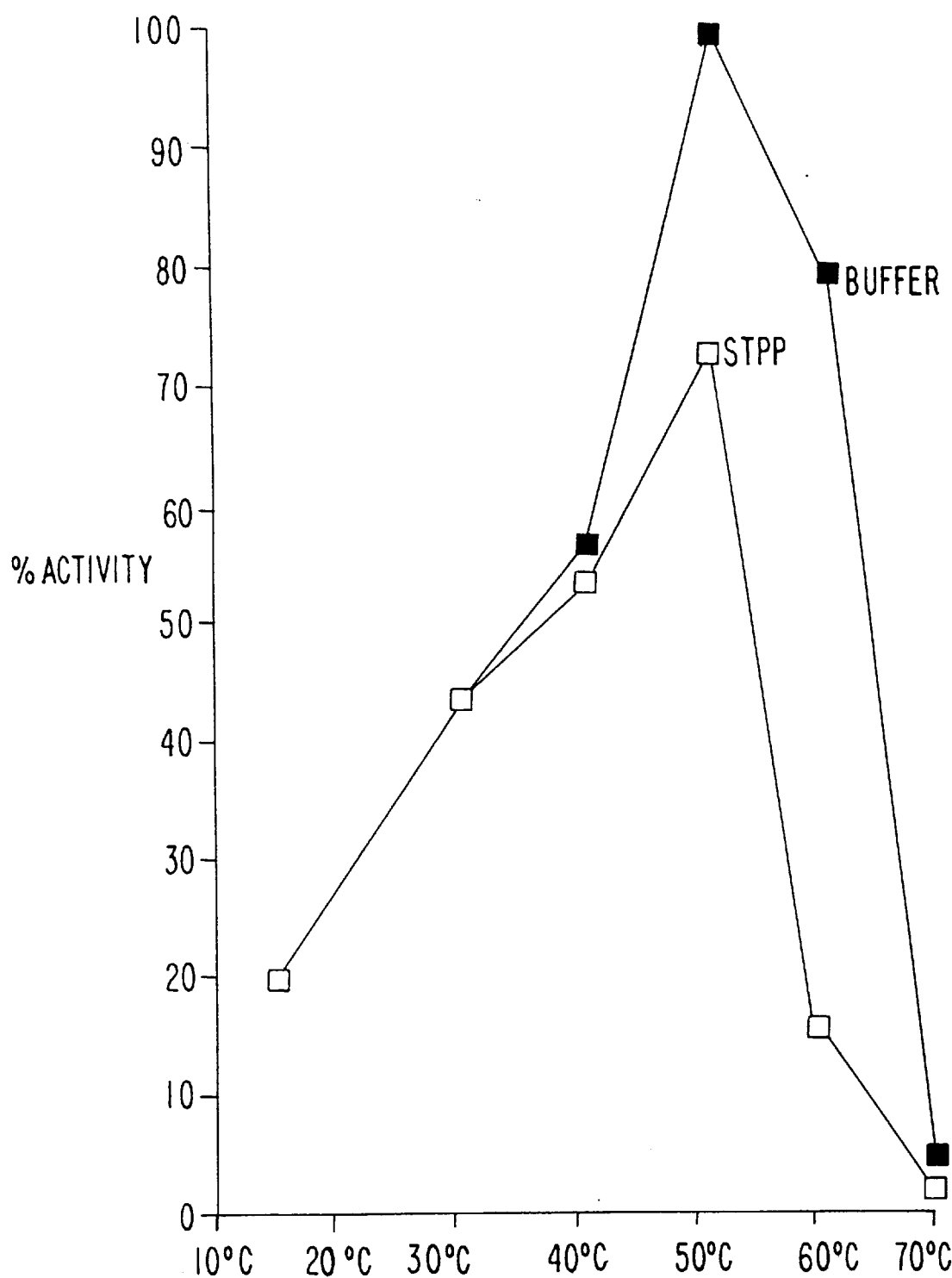
FIG. 2 is a graph showing the temperature activity of the SP 446 protease in the presence (white squares) and absence (black squares) of sodium tripolyphosphate (STPP)

The temperature dependence of the activity of the SP 446 protease was determined by the OPA casein method described above with the modifications that the enzyme reaction was carried out at different temperatures, i.e. 15° C., 30° C., 40° C., 50° C., 60° C. and 70° C., and that the enzyme reaction was conducted in the presence and absence of 0.1% sodium tripolyphosphate (STPP) which is a common ingredient in many commercial detergents. The results are shown in FIG. 2 from which it appears that the SP 446 protease has a temperature optimum of about 50° C. whether STPP is present or not.

Glu specificity

The Glu specificity of the SP 446 protease was determined as follows:

0.5 ml of 1 mg/ml human insulin in Universal Buffer, pH 9.5 (vide supra), and 75 µl SP 446 protease (0.6 cpu/l) in the same buffer were incubated for 120 min. at 37° C. The reaction was terminated by adding 50 µl 1N hydrochloric acid.

Figure 3:
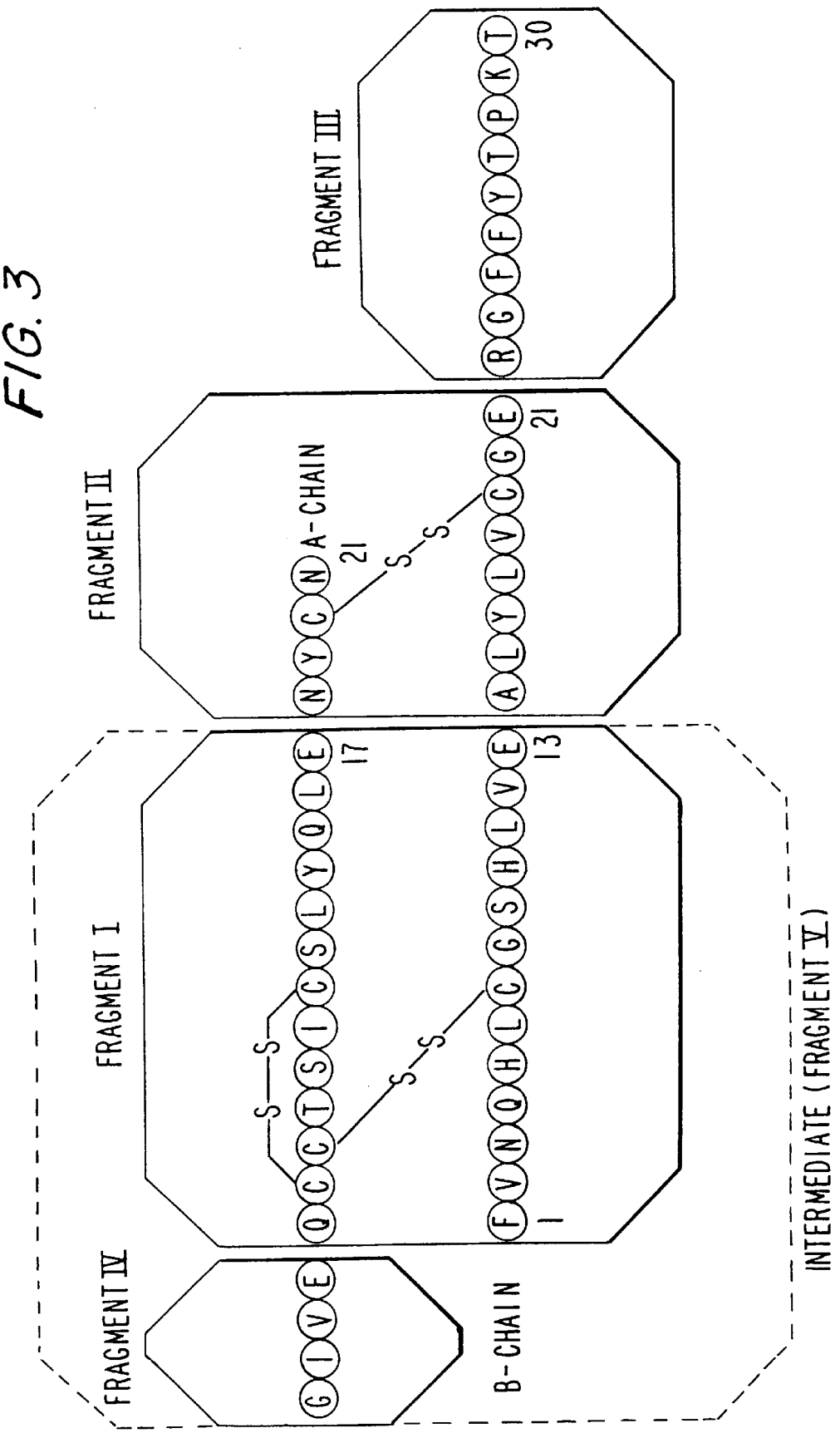
FIG. 3 shows the cleavage of insulin by the SP 446 protease.

The insulin molecule was cleaved into a number of peptide fragments. These were separated and isolated by reverse phase HPLC using a suitable C-18 column (Hibar LiChrosorb RP-18, 5 µm particles provided by Merck AG, Darmstadt, FRG). The fragments were eluted with the following solvents:

A. 0.2M sodium sulfate and 0.1M phosphoric acid, pH 2.5;

B. Acetonitrile/water, 50%;

on a linear gradient of from 90% A/10% B to 80% A/20% B for 0–5 min. and subsequently for 50 min. with 80% A/20% B. The isolated fragments were subjected to amino acid sequencing by automated Edman degradation, using an Applied Biosystems, Inc., (Foster City, Calif., USA) Model 470A gas-phase sequencer and the phenylthiohydantoin (PTH-) amino acids were analyzed by high performance liquid chromatography as described by L. Thim et al., "Secretion of human insulin by a transformed yeast cell", *FEBS Letters* 212(2), 1987, p.307, whereby the cleavage sites in the insulin molecule were identified as shown in FIG. 3.

N-terminal amino acid sequence

The N-terminal amino acid sequence of the purified SP 446 protease was determined as described above. The N-terminal sequence was determined to be

```
     1        5          10          15          20
     S V I G S D D R T R V T N T T A Y M T R—
```

Complete amino acid sequence

The complete amino acid sequence was determined from the DNA sequence. The DNA sequence was determined by standard techniques as described in the section entitled "Detailed Disclosure Of The Invention". The complete amino acid sequence is shown in the appended FIG. 4.

Based on this amino acid sequence, the molecular weight of the SP 446 protease was determined to be 23,600.

Inactivation of the SP 446 protease with DFP

Incubation of the enzyme with PMSF (1% in isopropanol) in a ratio of 1 to 10 (by volume) did not result in any inactivation of the SP 446 protease. However, incubation of 10 µl (1 mg/ml) of the enzyme with 80 µl 10 mM MOPS, pH 7.2, +10 µl 0.1M diisopropyl phosphofluoridate (DFP) for 60 min. resulted in complete inactivation of the enzyme as measured by its activity on the substrate CBZ—Phe—Leu—Glu—pNA.

EXAMPLE 2

Hydrolysis of Whey Protein

To 75 g of spray-dried whey protein (Lacprodan-80, available from Danmark Protein A/S, Nr. Vium, 6920

Videbaek, Denmark) dissolved in 800 ml of deionized water were added 14.7 cpu per 100 g of protein of the SP 446 protease and commercial trypsin (Pancreas Trypsin Novo 6.0 S, available from Novo Nordisk A/S, used as reference), respectively. The proteases were incubated with the whey protein for 4 hours at 65° C. and pH 8.0 by the so-called pH-stat method described in Information Sheet No. B 163f, November 1984, entitled "Use of Food Grade Alcalase$^R$ or Neutrase$^R$ for Controlled Enzymatic Hydrolysis of Proteins", available from Novo Nordisk A/S on request. The degree of hydrolysis measured for the whey protein was 12.1% obtained with SP 446 and 10.4 obtained with trypsin (the percentage is calculated from the total number of peptide bonds in the protein).

The degree of hydrolysis may be calculated by means of the following formula:

$$DH = \frac{\text{Number of peptide bonds cleaved}}{\text{Total number of peptide bonds}} \times 100$$

The total number of peptide bonds in a protein may be calculated from its amino acid composition. The number of peptide bonds cleaved may be determined from an assay of the free Ó-amino groups in the hydrolysate by the following method using trinitrobenzene sulphonic acid (TNBS):

0.25 ml of a sample containing between $0.25 \times 10^{-3}$ and $2.5 \times 10^{-3}$ amino equivalents/l is mixed in a test tube with 2.00 ml phosphate buffer at pH 8.2. 2 ml of a 0.1% TNBS solution is added and the test tube is shaken and placed in a water bath at 50°+/−1° C. for 60 min. During incubation, the test tube and water bath are covered with aluminium foil because the blank reaction is accelerated by exposure to light. After 60 min., 4.00 ml HCl is added to terminate the reaction, and the test tube is allowed to stand at room temperature for 30 min. before reading the absorbance spectrophotometrically against water at 340 nm. For further details, see J. Adler-Nissen, *J. Agric. Food Chem.* 27, 1979, p. 1256–1262.

EXAMPLE 3

To determine the ability of the SP 446 protease to hydrolyse whey proteins in milk without concomitantly clotting the milk, 0.2 cpu/l of subtilisin A and the SP 446 protease, respectively, were each added to 15 ml of whole milk at a pH of 6.8 and a temperature of 35° C. The reaction mixtures were allowed to stand for 3–4 hours. The milk containing subtilisin A clotted after a few minutes' incubation, whereas no clotting was observed in the milk containing the SP 446 protease after 3–4 hours' incubation with the enzyme. To the reaction mixture containing the SP 446 protease was then added Rennilase (registered trademark of Novo Nordisk A/S) to a concentration of 17.5 KRU/l (KRU=kilorenneting units, vide Information Sheet No. B250f, 1989, entitled "Cheesemaking with Rennilase" available from Novo Nordisk A/S on request) resulting in clotting of the milk after a few minutes' incubation.

EXAMPLE 4

0.1 cpu of the SP 446 protease was added to 1 l of pasteurized cow's milk standardized at 3.5% of fat at 34° C. and incubated for 3 hours followed by addition of 10 ml of a commercial starter culture in an amount of $1 \times 10^6 – 1 \times 10^7$ bacteria/g of milk. After standing for 10 minutes a stock solution of Ca was added, corresponding to 0.2 g of $CaCl_2 \cdot 0.2$ g of Rennilase 14 L (trademark of Novo Nordisk A/S for a commercial *Mucor miehei* protease) Batch PRN 1382 was then added with stirring and was then allowed to stand, resulting in the formation of a sufficiently firm curd after about 20 minutes. The curd was cut and salted in a manner known per se for the production of Feta cheese.

The remaining whey was subjected to SDS-PAGE in a manner known per se, from which it appeared that the high-molecular weight proteins (>30,000) had been decomposed to peptides with a molecular weight of less than 10,000.

We claim:

1. A process of producing cheese, comprising:
   (i) adding an enzyme preparation to milk so as to effect a limited specific hydrolysis of milk whey proteins, said enzyme preparation comprising a proteolytic enzyme which is capable of effecting said limited specific hydrolysis of whey proteins, but which does not cause any clotting of a whole milk sample, and wherein the enzyme preparation is substantially free from other proteolytic activity;
   (ii) adding to the milk a starter culture simultaneously with the enzyme preparation; and
   (iii) adding a milk-clotting enzyme to the milk simultaneously with the enzyme preparation added in step (i) simultaneously with the starter culture added in step (ii) so as to effect clotting of the milk to form a curd, wherein the resulting curd is processed in a manner known per se for producing cheese.

2. A process according to claim 1, wherein the proteolytic enzyme has the following characteristics:
   (a) it is a serine protease specific for glutamic acid (Glu) and aspartic acid (Asp) residues;
   (b) it has a specific activity at least of 25 cpu per gram of enzyme protein;
   (c) it has a molecular weight of about 23,600;
   (d) it is inhibited by diisopropyl phosphofluoridate, but not by phenylmethane sulfonylfluoride;
   (e) it exhibits 75% or more of its maximum activity in the pH range of 6.5–10.0.

3. A process according to claim 1 or 2, wherein the milk is concentrated milk.

4. A process according to claim 3, wherein the enzyme preparation is added after concentrating the milk.

5. A process according to claim 1, wherein the proteolytic enzyme is one producible by a bacterium.

6. A process according to claim 5, wherein the microorganism is a strain of *Bacillus licheniformis*.

7. A process according to claim 6, wherein the proteolytic enzyme has the amino acid sequence of SEQ ID NO: 1.

8. A process according to claim 3, wherein the starter culture is added after concentrating the milk.

9. A process according to claim 1, wherein the milk-clotting enzyme is of animal or microbial origin.

10. A process according to claim 1, wherein the enzyme preparation is added in an amount of 0.005–0.25 cpu/l of milk.

11. A process according to claim 1, wherein the milk-clotting enzyme is added in an amount of 18–25 ml of a commercial enzyme preparation per 100 l of milk.

12. A process according to claim 1 for producing hard or semi-hard cheese.

13. A process according to claim 1 for producing cheese which stretches and melts on heating.

* * * * *

SEQUENCE LISTING ( 1 ) GENERAL INFORMATION:

( i i i ) NUMBER OF SEQUENCES: 1

( 2 ) INFORMATION FOR SEQ ID NO: 1:

( i ) SEQUENCE CHARACTERISTICS:
        ( A ) LENGTH: 222 amino acids
        ( B ) TYPE: amino acid
        ( D ) TOPOLOGY: linear ( i i ) MOLECULE TYPE: protein ( x i ) SEQUENCE DESCRIPTION: SEQ ID NO:1:

```
Ser  Val  Ile  Gly  Ser  Asp  Asp  Arg  Thr  Arg  Val  Thr  Asn  Thr  Thr  Ala
                    5                        10                       15
Tyr  Pro  Tyr  Arg  Ala  Ile  Val  His  Ile  Ser  Ser  Ser  Ile  Gly  Ser  Cys
                    20                       25                       30
Thr  Gly  Trp  Met  Ile  Gly  Pro  Lys  Thr  Val  Ala  Thr  Ala  Gly  His  Cys
                    35                       40                       45
Ile  Tyr  Asp  Thr  Ser  Ser  Gly  Ser  Phe  Ala  Gly  Thr  Ala  Thr  Val  Ser
                    50                       55                       60
```

-continued

| Pro 65 | Gly | Arg | Asn | Gly | Thr 70 | Ser | Tyr | Pro | Tyr | Gly 75 | Ser | Val | Lys | Ser | Thr 80 |
| Arg | Tyr | Phe | Ile | Pro 85 | Ser | Gly | Trp | Arg | Ser 90 | Gly | Asn | Thr | Asn | Tyr 95 | Asp |
| Tyr | Gly | Ala | Ile 100 | Glu | Leu | Ser | Glu | Pro 105 | Ile | Gly | Asn | Thr | Val 110 | Gly | Tyr |
| Phe | Gly | Tyr 115 | Ser | Tyr | Thr | Thr | Ser 120 | Ser | Leu | Val | Gly | Thr 125 | Thr | Val | Thr |
| Ile | Ser 130 | Gly | Tyr | Pro | Gly | Asp 135 | Lys | Thr | Ala | Gly | Thr 140 | Gln | Trp | Gln | His |
| Ser 145 | Gly | Pro | Ile | Ala | Ile 150 | Ser | Glu | Thr | Tyr | Lys 155 | Leu | Gln | Tyr | Ala | Met 160 |
| Asp | Thr | Tyr | Gly | Gly 165 | Gln | Ser | Gly | Ser | Pro 170 | Val | Phe | Glu | Gln | Ser 175 | Ser |
| Ser | Arg | Thr | Asn 180 | Cys | Ser | Gly | Pro | Cys 185 | Ser | Leu | Ala | Val | His 190 | Thr | Asn |
| Gly | Val | Tyr 195 | Gly | Gly | Ser | Ser | Tyr 200 | Asn | Arg | Gly | Thr | Arg 205 | Ile | Thr | Lys |
| Glu | Val 210 | Phe | Asp | Asn | Leu | Thr 215 | Asn | Trp | Lys | Asn | Ser 220 | Ala | Gln | | |